United States Patent [19]

Lindell et al.

[11] 3,902,014

[45] Aug. 26, 1975

[54] CIRCUIT ARRANGEMENT FOR REGENERATING THE MODULATION TIMING OF A LINE SIGNAL IN A DATA TRANSMISSION EQUIPMENT

[75] Inventors: Key Ake Lindell, Skarholmen; Goran Karl Arvid Pettersson, Stockholm, both of Sweden

[73] Assignee: Telefonaktiebolaget LM Ericsson, Stockholm, Sweden

[22] Filed: Aug. 15, 1973

[21] Appl. No.: 388,607

[30] Foreign Application Priority Data

Sept. 12, 1972 Sweden ............................ 11726/72

[52] U.S. Cl. ........ 178/69.5 R; 179/15 BS; 325/322; 325/419

[51] Int. Cl.$^{2}$ ........................................ H04L 7/00

[58] Field of Search .......... 179/15 BS; 325/63, 320, 325/321, 346, 322, 416, 418, 419, 420, 423, 427, 467; 178/68, 69.5 R, 88

[56] References Cited

UNITED STATES PATENTS 3,057,959 10/1962 Rowe ............................ 178/69.5 R

*Primary Examiner*—Robert L. Griffin
*Assistant Examiner*—Marc E. Bookbinder
*Attorney, Agent, or Firm*—Hane, Baxley & Spiecens

[57] ABSTRACT

A circuit arrangement in the receiver of a data transmission equipment for regenerating the modulation timing of an incoming line signal includes a detector for detecting the modulation timing of the incoming signal which is connected to a first input of a summing circuit. The output of the summing circuit is connected to the second input thereof via a controllable switch and a bandpass filter having a center frequency equal to the frequency of the modulation timing. Upon the start of the transmission the switch is in its open state and the figure of merit of the circuit is low. After a certain time the switch is closed and a feedback loop is obtained whereby the figure of merit is increased.

3 Claims, 2 Drawing Figures

Figure 1:
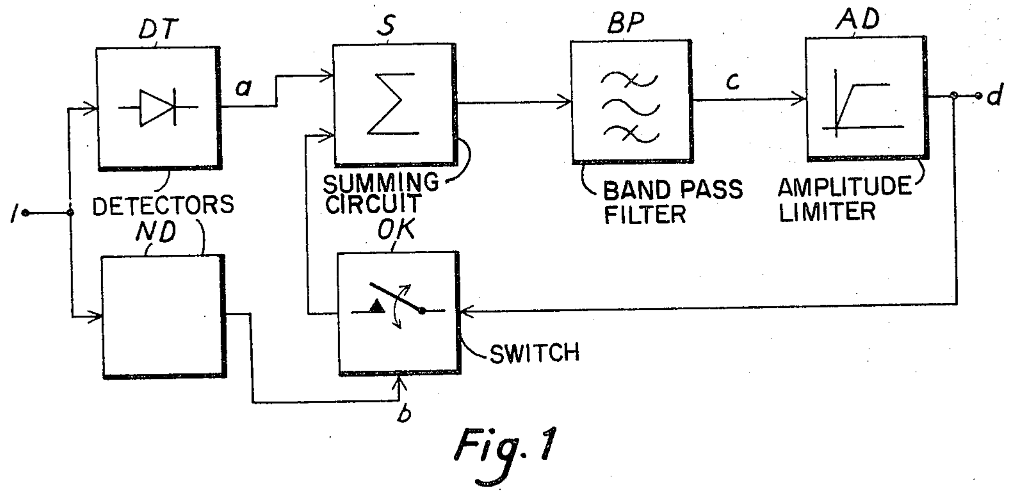

CIRCUIT ARRANGEMENT FOR REGENERATING THE MODULATION TIMING OF A LINE SIGNAL IN A DATA TRANSMISSION EQUIPMENT

The present invention relates to the error-free regeneration of a timing signal in a data transmission equipment. During synchronous data transmission, i.e., when a transmitter and a receiver operate in synchronism, there is during the information detection at the receiver a need for regenerating the modulation timing of the line signal. This timing regeneration can be carried out with a so-called tank circuit, i.e., an oscillating circuit for storing oscillation power. In such an application it is desirable that the tank circuit shows the highest possible, or figure of merit, in order to be able to regenerate the received modulation timing independent of the jitter and the time dependent amplitude variations of the line signal.

In certain applications of the data transmission technique it sometimes happens that a receiver must be able to co-operate with several transmitters in a time division multiplex mode. Accordingly, the receiver should be able to have a rapid start, thus requiring a short time for synchronization. This requirement, however, implies in contrast to the first mentioned that it is desirable to have a small value on the figure of merit of the tank circuit. The fundamental idea of the invention is consequently that when starting the receiver the figure of merit of the circuit should be low and after the synchronization of the respective transmitter the factor of merit should be increased.

A previously known circuit for the same purpose as the present invention is constituted by a so called "phase lock loop" circuit, described in, for example, Gardner "Phase locked technics" McGraw Hill Book Co, 1966. Such a circuit has a high figure of merit when synchronizing with the incoming timing signal. The drawback with a tank circuit of this kind is, however, that because of the existing feed-back in the circuit, a signal appears on the output of the circuit, having a frequency which is equal to the self-oscillating frequency of the circuit. This frequency in general is not equal to the frequency of the timing signal which is to be regenerated from the incoming signal. In order that the self-oscillating frequency of the known circuit be locked to the desired frequency, i.e., the frequency of the incoming line signal, a certain time is required, during which no timing information is available.

According to the principle of the invention, no self-oscillating frequency occurs, instead the incoming line signal from the start is utilized as timing information. After a certain time a feed-back loop is formed in the circuit, to form a feed-back circuit having an essentially figure factor of merit. This circuit from the start oscillates at exactly the same frequency as the desired timing frequency of the incoming signal. Thus the required timing is obtained at the moment when the incoming line signal appears on the input of the receiver.

An object of the present invention is consequently to provide a circuit in the receiver of a synchronous data transmission equipment in which the modulation timing of the incoming line signal can be regenerated practically without a time delay after the connection of the receiver to a transmitter. In the steady state the modulation timing is regenerated independently of the disturbances and amplitude variations of the line signal.

Figure 2:
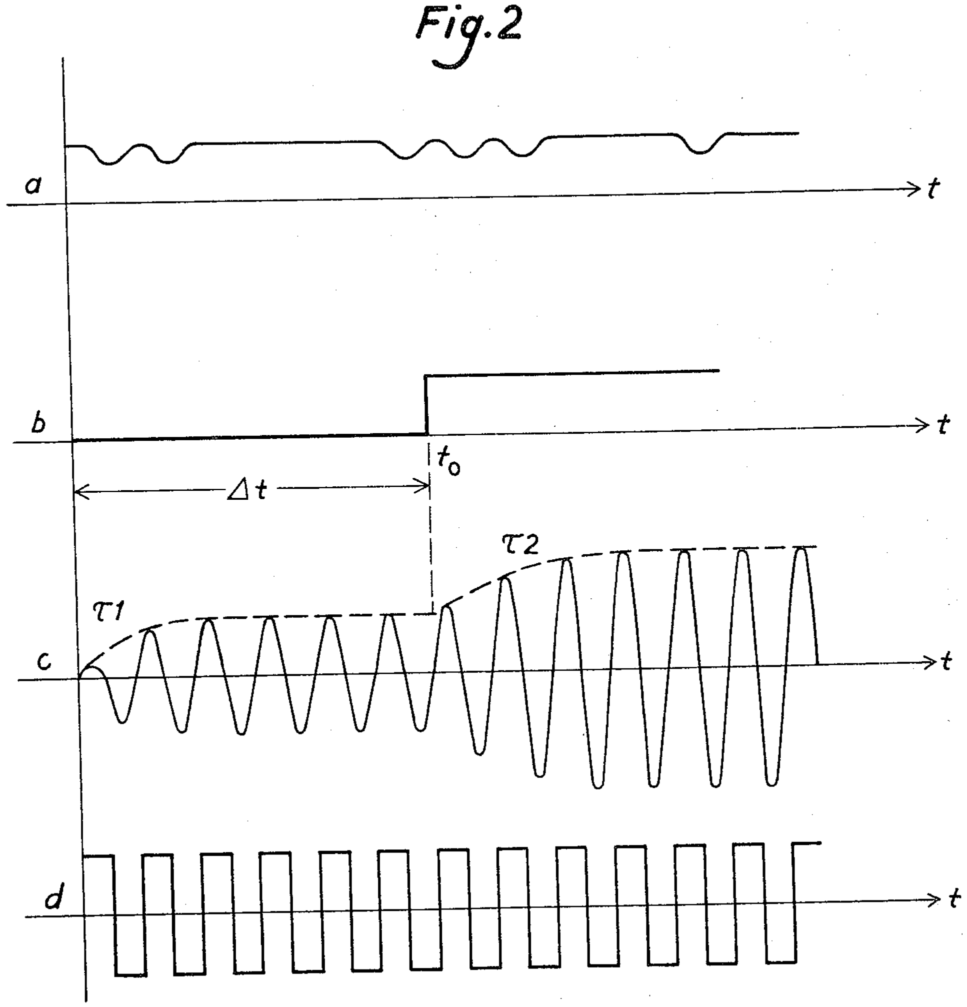

The invention the characteristics of which appear from the appended claims, will be described more in detail with reference to accompanying drawing in which:

FIG. 1 shows a block diagram of the circuit according to the present invention; and FIG. 2 shows different wave forms, which appear in the circuit according to FIG. 1.

When transmitting data information, i.e., the so called base band signal, frequency or phase shift modulated signals, which have been modulated in the transmitter can be used so that a signal which is adapted to the line can be transmitted. This line signal always contains information about the timing with which the original carrier signal in the transmitter has been modulated, the timing frequency of which henceforthwill be represented by fm. In the receiver the line signal is detected, and a signal according to FIG. 2, line *a*, is obtained.

In FIG. 1, a block diagram is shown for the circuit according to the present invention for the purpose mentioned above. This circuit will be described more in detail in connection with the wave forms according to FIG. 2. The terminal I in FIG. 1 constitutes the common input of a detector ND for detection of a pre determined level of the incoming signal and of a detector DT for detection of the waveform envelope of the incoming signal. There is received at this input the incoming line signal whose modulation timing is to be regenerated. The detector DT, which in principle consists of a rectifier circuit or envelope detector detects the envelope of the line signal, which signal is shown in line *a* of FIG. 2. With BP a band pass filter is designated, having center frequency fo which in the main is the same as the frequency of the modulation timing *fm*. The difference between the values of the frequencies *fo* and *fm* depends primarily on the permissible variations in the elements included in the band pass filter BP. This band pass filter is connected with its input to the output of a summing circuit S and with its output connected to an amplitude limiter AD. The summing circuit S consists as known of a feed-back operational amplifier with associated input resistor. One of its inputs is connected to the output of the detector DT and its other input is connected to a controllable switch OK, for example a transistor circuit, which is connected to the output of the limiter AD. When the switch OK is closed in dependence on a control signal delivered from the level detector ND, a feed-back circuit is formed for feeding the level limited signal from the band pass filter BP to the second input of summing circuits for summing with the incoming and detected signal from detector DT. In this way a circuit is formed which presents a higher figure of merit to the incoming detected signal than that which existed before the establishment of the feed-back.

The level detector ND operates with a certain time delay, which means that after a certain time $\Delta t$ it will be activated to deliver a signal to the controllable switch OK in dependence on the level of the incoming signal. The delay $\Delta t$ is chosen primarily in dependence on the time constant $\tau 1$ of the band pass filter BP, compare FIG. 2, line c. In FIG. 2, line a, the outgoing signal from the detector DT is shown and in FIG. 2, line *b*, the outgoing signal from the level detector ND is shown where said time delay $\Delta t$ is indicated. Before the instant $t_0$, the band pass filter BP will only receive the detected line signal, which is filtered and then limited the amplitude limiter AD. At the instant $t_0$, according to FIG. 2, line *b*, a feed-back circuit is formed by closing the switch OK, which circuit except for the switch OK, also contains the summing circuit S, the band pass filter BP and the amplitude limiter AD. During the time $\Delta t$ the figure of merit of the circuit is low and equal to the figure of merit of the band pass filter BP alone, while after the time $t_0$, the figure of merit of the circuit has increased due to the influence of the feed-back, and the circuit then operates as a "phase lock loop" circuit. In FIG. 2, line *c*, the outgoing signal from the band pass filter BP is shown and in line *d* the pulse shaped outgoing signal from the amplitude limiter AD is shown. At the beginning of the time interval $\Delta t$ the amplitude of the outgoing signal from the band pass filter BP will increase with a time constant $\tau 1$ determined by the figure of merit of the band pass filter, the frequency of such outgoing signal constituting the desired modulating frequency *fm*, since *fo* in the main is equal to *fm*. The square wave signal which is received on the output of the amplitude limiter AD corresponds in frequency and phase in the main to the frequency of the modulation timing *fm* of the incoming line signal.

When an outgoing signal is fed from the level detector ND to the switch OK, the feed-back circuit thus formed will start to oscillate with a frequency which corresponds to the frequency of the modulation timing fm of the incoming line signal, but with a phase position which differs somewhat from the line signal coming to the summing circuit S. Its phase deviation is the so called phase error, which always occurs in a "phase lock loop" circuit of the first order. This deviation of the phase position is dependent on the self-oscillating frequency of the feed-back circuit in relation to the frequency of the signal coming to the summing circuit S. By "self-oscillating frequency" is here meant the frequency with which the feed-back circuit oscillates as a "phase lock loop" circuit in absence of an incoming signal to the summing circuit S. This frequency is dependent on the value of the center frequency fo of the band pass filter. Owing to the fact that a signal always appears across the input of the summing circuit S, i.e., at the input of the feed-back circuit, there is never a signal with the self-oscillating frequency of the feed-back circuit. For this reason no synchronization of this signal frequency to the frequency of the incoming signal is necessary in contrast to the known "phase lock loop" circuit. Thus when using the circuit according to the present invention, the modulation timing can be regenerated more rapidly after the receiver unit has been connected to the line. In the known "phase lock loop" circuit a synchronization of the self-oscillating frequency of the circuit to the modulation timing of the line signal first occurs, and this synchronization requires a certain time. This time must be increased if a higher figure of merit of the circuit is desired, i.e., if less jitter in the modulation timing is demanded. With the circuit according to the present invention, a rapid start of the receiver can be obtained in spite of the fact that extensive jitter can occur in the timing signal because the figure of merit of the circuit at start is much less than the figure of merit which in the steady state is demanded for suppression of said jitter in the timing signal.

By establishing a feedback in a circuit in which the band pass filter BP is included, a phase locked oscillator is obtained wherein an oscillating circuit is formed by the feed-back loop in which the phase of the oscillation from the start is locked to the phase of the incoming signal. This oscillator has a holding range, i.e., a frequency range within which the phase of the oscillation is locked to the phase of the incoming signal. Outside this range the oscillator drops out, i.e., it starts to oscillate with its own natural frequency, which differs from the frequency of the incoming signal. The magnitude of the frequency deviation as a function of the phase difference is determined by the relation $$\Delta f = K.\hat{b}.\ \sin(\phi b - \phi e)$$

where $\hat{b}$ is the amplitude of the incoming signal, $\phi b$ is its phase position relatively a zero point, $\phi e$ is the phase position of the outgoing signal from the circuit relative the same zero point, and *K* is a constant determined by the actual circuit in question. See for example the article "Miniaturized RC filters" from "Bell System Technical Journal," May–June 1965, page 826.

The frequency deviation $\Delta f$ is determined by the deviation which in practice is between the value of the frequency of the modulation timing *fm* and the central frequency *fo* of the band pass filter. The magnitude of the phase deviation $(\phi b - \phi e)$ is chosen with respect to the overall system.

The figure of merit *Qf* of the feed-back circuit is obtained by studying the transfer function of the circuit. This function has in the complex frequency plane ($\phi$—$j\omega$-plane) in general two complex poles. The 3-dB band limits $(\phi b - \phi e) = 45°$ and the band width Bf (the 3-dB bandwidth) can be obtained from the expression for the frequency deviation $\Delta f$ according to the above. One of the band limits is given by the condition $(\phi b - \phi e) = +45°$ and the other band limit is given by the condition $(\phi b - \phi e) = -45°$, which yields $$Bf = f_{+45°} - f_{-45°} = K\hat{b}(\sin 45° - \sin\text{-}45°) = K\hat{b}.2/\sqrt{2}.$$

The figure of merit *Qf* is thereafter obtained by the known formula $$Q = f_0/B,$$

which gives $$Qf = f_0\ \sqrt{2}/2.K\hat{b}.$$

The holding range for the phase locked oscillator is determined by the equation for the frequency deviation $\Delta f$. By putting the expression $\sin(\phi b - \phi e) = 1$ the magnitude of the holding range is obtained as *K.b*. A higher figure of merit can consequently be obtained by bringing down the magnitude of the holding range, as both the figure of merit and the holding range of the circuit are dependent on the factor *K.b*.

We claim:

1. In the receiver of a digital data transmission system, apparatus for regenerating the modulation timing of received line signals which are binarily modulated comprising: a band pass filter having an input and an output and having a center frequency generally equal to a frequency corresponding to the modulation timing; a timing signal output; means for connecting said timing signal output to the output of said band pass filter; a signal summing means having first and second inputs and an output for the analog addition of the amplitudes of the signals present at said first and second inputs; means for connecting the output of said signal summing means to the input of said band pass filter; a detector means having an input adapted to receive the line signals and an output for transmitting from the output thereof a signal representing at least one border of the envelope of a line signal received at the input thereof; means for connecting the output of said detector means to the first input of said summing means; a controllable switch means having a signal input connected to said timing signal output, a signal output connected to the second input of said signal summing means, and a control input, said switch being open until the receipt of a signal at said control input; and a signal level detector having an input adapted to receive a line signal and an output connected to the control input of said switch, said signal level detector emitting a signal from the output thereof when the signal present at the input thereof exceeds a given amplitude.

2. The apparatus of claim 1 wherein said means for connecting the output of said band pass filter to said timing signal output comprises a signal amplitude limiter.

3. The apparatus of claim 1 wherein said signal level detector includes delay means for delaying the emission of a signal therefrom for a period of time related to the time constant of said band pass filter.

* * * * *